United States Patent [19]
Senda

[11] Patent Number: 6,019,506
[45] Date of Patent: Feb. 1, 2000

[54] METHOD FOR ESTIMATING THERMAL DISPLACEMENT IN A MACHINE TOOL

[75] Inventor: Harumitsu Senda, Aichi-ken, Japan

[73] Assignee: Okuma Corporation, Japan

[21] Appl. No.: 09/135,767

[22] Filed: Aug. 18, 1998

[30] Foreign Application Priority Data

Aug. 19, 1997 [JP] Japan .................................. 9-222786

[51] Int. Cl.[7] .......................... G01N 25/00; G01N 21/86; G06F 19/00
[52] U.S. Cl. ................................. 374/55; 374/56; 364/474
[58] Field of Search .................... 374/6, 55, 56

[56] References Cited

U.S. PATENT DOCUMENTS

| | | | |
|---|---|---|---|
| 3,308,550 | 3/1967 | Katz et al. | 374/6 |
| 3,416,373 | 12/1968 | Havens | 374/6 |
| 4,919,575 | 4/1990 | Yoshimi et al. | 409/231 |
| 4,928,019 | 5/1990 | Tomikawa et al. | 250/561 |
| 5,581,467 | 12/1996 | Yasuda | 364/474.35 |
| 5,779,405 | 7/1998 | Aiso et al. | 409/132 |
| 5,895,181 | 4/1999 | Ito et al. | 409/132 |

FOREIGN PATENT DOCUMENTS

| | | |
|---|---|---|
| 57-033938 | 2/1982 | Japan . |
| 0117402 | 6/1986 | Japan .................................. 374/6 |
| 94022779 | 3/1994 | Japan . |

*Primary Examiner*—G. Bradley Bennett
*Assistant Examiner*—Gail Verbitsky
*Attorney, Agent, or Firm*—Lahive & Cockfield, LLP

[57] ABSTRACT

A method for estimating the thermal displacement of a rotatable component of a machine tool is provided which includes the steps of: (A) generating a signal representative of the temperature of at least one rotatable component of a machine tool, the component being rotatable having a variable rotational speed and a variable temperature; (B) converting the signal representative of the temperature into a numerical value; and (C) estimating the thermal displacement of the rotatable component based on the numerical value using an operational expression. In this method, the operational expression includes a coefficient which is a function ($f(n)$) that changes with time or the number($n$) of compensation operations performed, with the function ($f(n)$) determined by a relational expression $T(N)$) relating the time constant ($T \delta$) of the thermal displacement and the rotational speed ($N$) of the rotatable component. In according to this method, the relational expression ($TN$)) is obtained by experiment and held in a storage device prior to implementation of the process of estimation.

10 Claims, 9 Drawing Sheets

METHOD FOR ESTIMATING THERMAL DISPLACEMENT IN A MACHINE TOOL

BACKGROUND OF THE INVENTION

1. Field of the Invention

The present invention generally relates to a method for estimating thermal displacement of a component of a machine tool by using an experimentally obtained expression.

2. Description of the Prior Art

Generally, due to its mechanical nature, a machine tool has several heat sources, such as the roller bearings of the main shaft. Heat generated from such sources is conducted to other components of the machine tool, causing thermal displacement of mechanical components. Generally, when the thermal displacement is in a steady state, for example, when the rotational speed of the main shaft is constant, the following expression accurately accounts for the proportional relationship between the thermal displacement of the main shaft and the difference in temperature between the main shaft and the bed:

$$\text{Thermal displacement} = K \times \text{temperature difference} \quad (1)$$

where K=coefficient.

Since such thermal displacement greatly affects the accuracy of machining, various methods for estimating and/or compensating for this thermal displacement in a machine tool have been proposed. One conventional method is to cool the heat sources. Another is to estimate the thermal displacement based on the temperature of a machine tool and then to compensate for its thermal displacement.

An example of the latter method is disclosed in Japanese Published Examined Patent Application No. S61-59860. This particular method attempts to estimate the thermal displacement of the main shaft by using an experimentally obtained and memory-stored expression representing the relationship between the displacement and the temperature difference between the main shaft head and of the body of a machine tool, which is subjected to relatively small temperature fluctuations. This method includes the steps of (1) measuring the temperatures of the main shaft head and of the body of a machine tool, which is subjected to relatively small temperature fluctuations, based on outputs of two sensors attached to these two components and (2) estimating the thermal displacement of the main shaft based on the difference between the instantaneous outputs of the two sensors. Subsequently, compensation corresponding to the estimated displacement is made by a servomechanism.

Japanese Published Examined Patent Application No. H6-22779 discloses another method that estimates the thermal displacement of the main shaft in the axial direction of a machine tool by using experimentally obtained expressions for the thermal displacement of different elements of the main shaft.

However, because these conventional methods use instantaneous values representative of detected temperatures, they cannot compensate for the delays caused by the time constant of the temperature change and the time constant of the thermal displacement. Therefore, an estimation error tends to occur when the thermal displacement is in a transient state following a change in the rotational speed of a rotatable component, such as the main shaft. Furthermore, these methods do not take into account a change in the rotational speed of the main shaft when thermal displacement is already in a transient state. Nor do they take into account the fact that the time constants can change as a function of the rotational speed of the main shaft. For these reasons, these known methods fail to accurately estimate thermal displacement under all operational conditions of a machine tool.

Figure 1A:
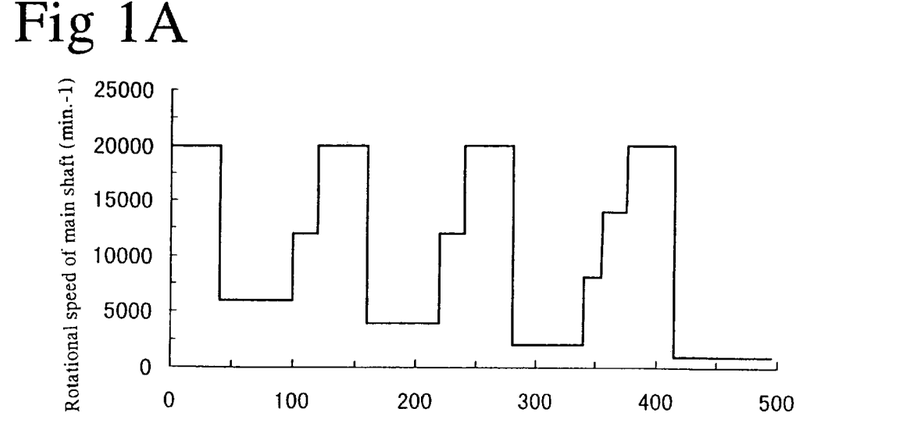
FIG. 1A is a graph showing changes with time in the rotational speed of the main shaft of a machining center in an experiment.
Figure 1B:
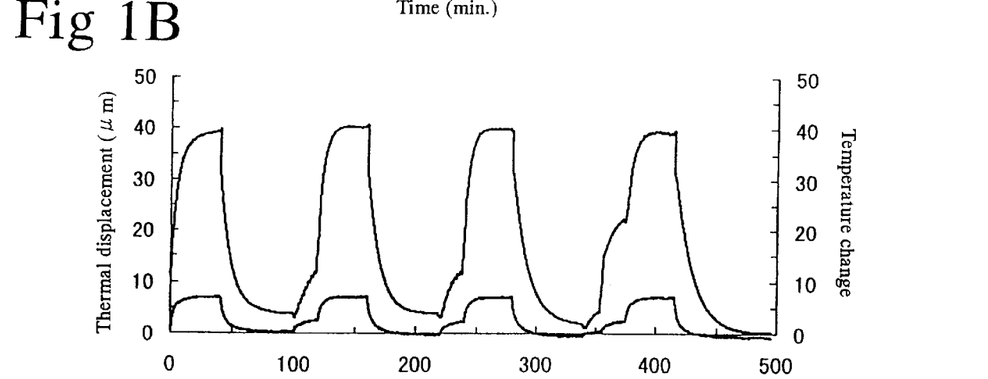
FIG. 1B is a graph showing the relationship between the thermal displacement of the main shaft and the fluctuations in the temperature of the main shaft (relative temperature difference between the main shaft and the body of a machine tool) in the experiment of FIG. 1A.

To illustrate the foregoing, an experiment was conducted to determine the accuracy of the conventional method following a change in the rotational speed of a rotatable component. FIG. 1A is a graph showing changes made in the rotational speed of the main shaft of a machining center in this experiment. The graph of FIG. 1B shows the relationship between the thermal displacement of the main shaft and the fluctuations in the temperature of the main shaft (relative temperature difference between the main shaft and the body of a machine tool) in this experiment. The thermal displacement of the main shaft was estimated by the conventional method using the instantaneous values for the temperature difference in the following expression:

$$\text{Thermal displacement } \delta = 5 \times (\text{temperature difference} + 0.8). \quad (2)$$

Figure 1C:
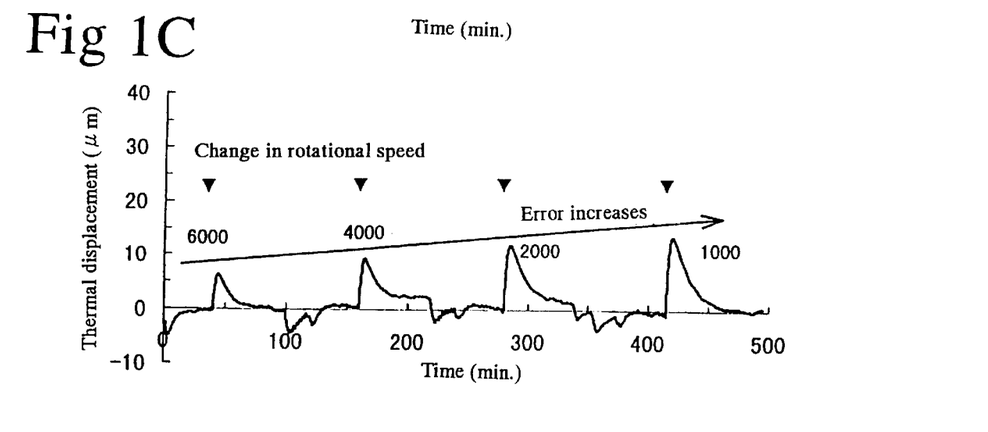
FIG. 1C is a graph showing the estimated error of the thermal displacement estimated by a known method when compared to the actual thermal displacement.

FIG. 1C is a graph showing the estimated error of the thermal displacement estimated by the conventional method when compared to the actual thermal displacement.

Figure 2A:
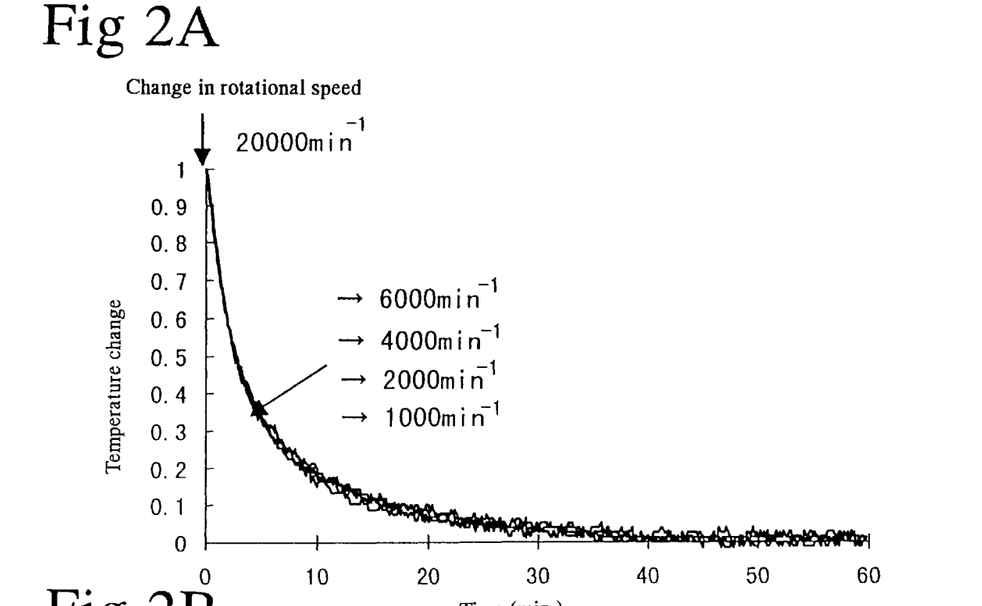
Figure 2B:
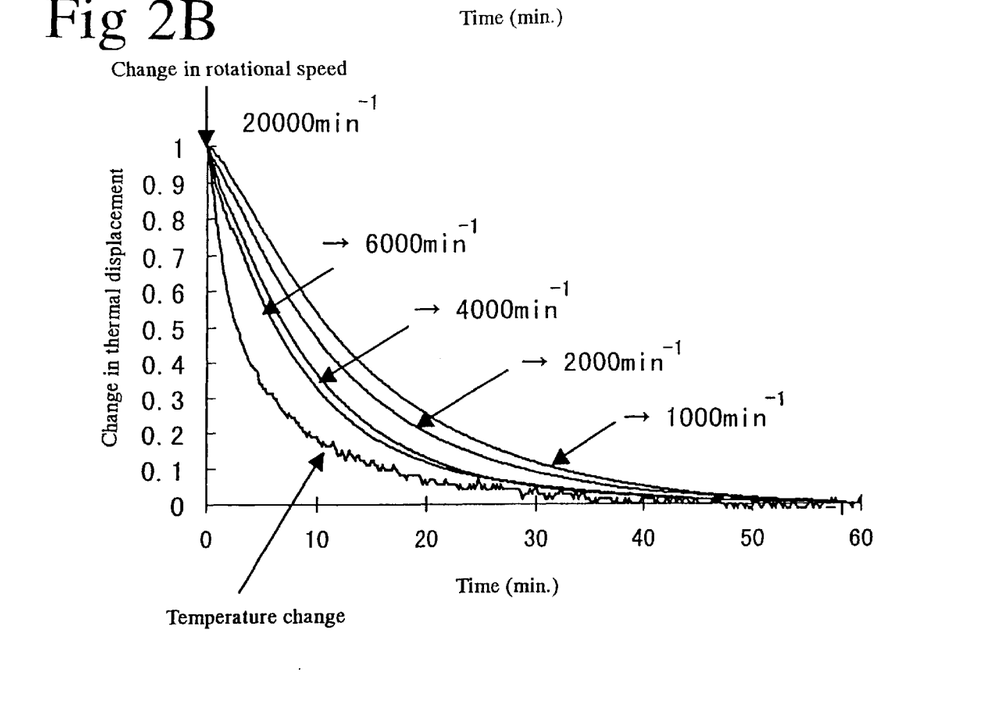

The error fluctuations indicate that the error is significant in the transient state following each change from a high rotational speed to a low rotational speed and that it is increasingly more pronounced as the amount of change in the speed is greater. To further illustrate this drawback inherent in the method that uses the instantaneous values of temperatures, FIGS. 2A and 2B show the measurements of the temperature difference and thermal displacement, respectively, divided by the amount of change for each instance of reduction in the rotational speed (from 20,000 $\text{min}^{-1}$ to 6,000 $\text{min}^{-1}$, from 20,000 $\text{min}^{-1}$ to 2,000 $\text{min}^{-1}$, etc.). The graph of FIG. 2B includes the curve for the temperature difference for comparison.

It can be clearly seen from these charts that while the curves representing the temperature differences exhibits very similar time constants regardless of the degree of change in the rotational speed, the time constant of the thermal displacement becomes greater as the change in the rotational speed becomes greater. In short, if instantaneous temperature outputs are used to estimate thermal displacement in a transient state, the difference between the time constant of the thermal displacement and that of the temperature results in error in estimate which is more pronounced as the change from a higher speed to a lower rotational speed becomes greater.

Applicant of the present application discloses in Japanese Published Examined Patent Application No. H8-30982 (which corresponds to U.S. patent application Ser. No. 08/800,581) novel methods for estimating the thermal displacement of a main shaft of a machine tool in a transient state following a change in the rotational speed until a steady state is restored. This method includes a step of estimating the thermal displacement of a main shaft using an operational expression which includes a time-varying coefficient or a coefficient that changes with the number of compensation operations performed thus far. In this way, since the time response of the temperature change coincides with the time response of the thermal displacement when the thermal displacement is in a transient state, the thermal displacement of the main shaft can be accurately estimated under all operating conditions.

In one embodiment of the above-described method, when the thermal displacement is in a transient state, filtering is performed on the measured temperature data of a target machine tool component, such as the main shaft. Preferably, a digital filter such as an exponential smoothing filter can be used for this purpose. A time-varying function f(n) is used as the filter coefficient. Alternatively, the function f(n) may be a function that changes with the temperature data sampling intervals or with the number of estimation operations performed thus far. Particularly, a tentative value for an estimate of the thermal displacement is given by the following operational expression:

$$Y_n = Y_{n-1} + (X_n - Y_{n-1}) \cdot f(n) \quad (3)$$

where $X_n$=temperature data from nth measurement, $Y_n$=nth tentative value for estimation of thermal displacement, f(n)=filter coefficient, and n=number of estimation operations (period of time).

Figure 3:
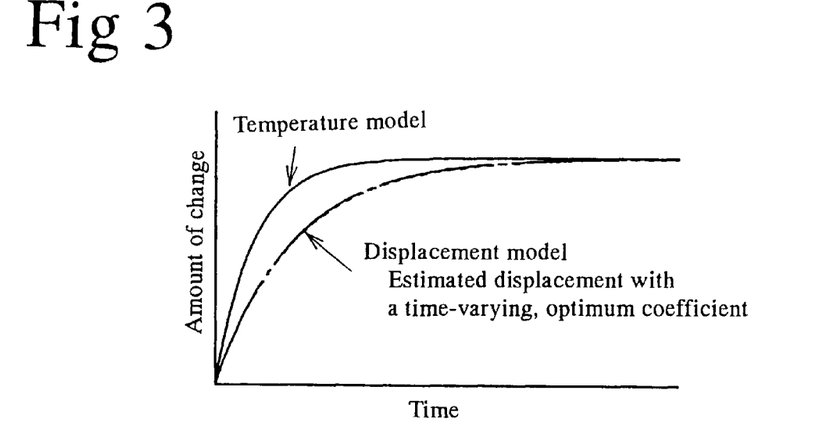
FIG. 3 is a graph showing an estimate of thermal-induced displacement obtained by an operational expression having an optimum filter coefficient.
Figure 4:
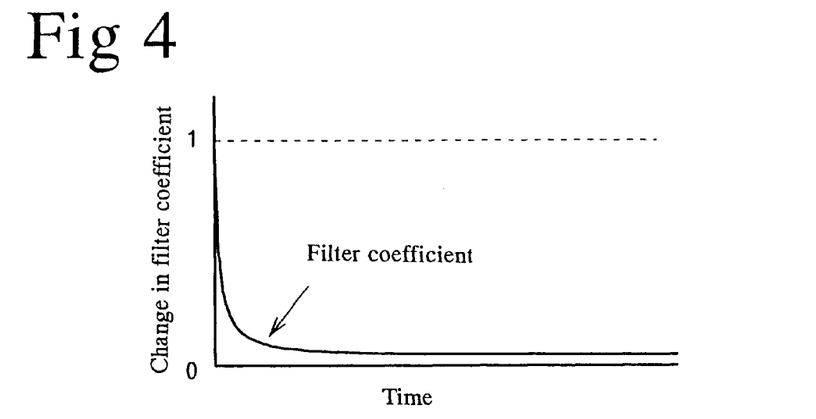
FIG. 4 is a graph showing a change in a filter coefficient with time.
Figure 5:
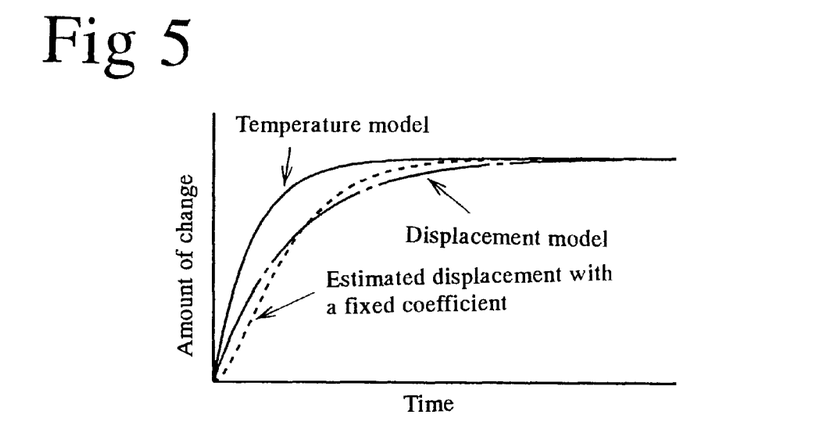
FIG. 5 is a graph showing an estimate of thermal displacement obtained by an operational expression having a fixed filter coefficient.

In this way, the coefficient is continuously changed to an optimum value so that the difference between the estimated thermal displacement and the thermal displacement model is minimized even when the displacement is in a transient state as shown in FIG. 3. FIG. 4 is a graph showing the filter coefficient function f(n) that changes with time. This embodiment, therefore, can compensate for the difference between the time constant of the temperature and the time constant of the thermal displacement, thus accurately estimating the thermal displacement of a machine tool component under all operating conditions, whether the thermal displacement is in a transient state or in a steady state. It should be noted that if the filter coefficient function f(n) is kept constant as shown in FIG. 5, the same dead time appears in the time response of the estimated thermal displacement as when first order lag system temperature data is input into the first order system. Consequently, an accurate estimate of the thermal displacement cannot be obtained in that case.

Figure 6:
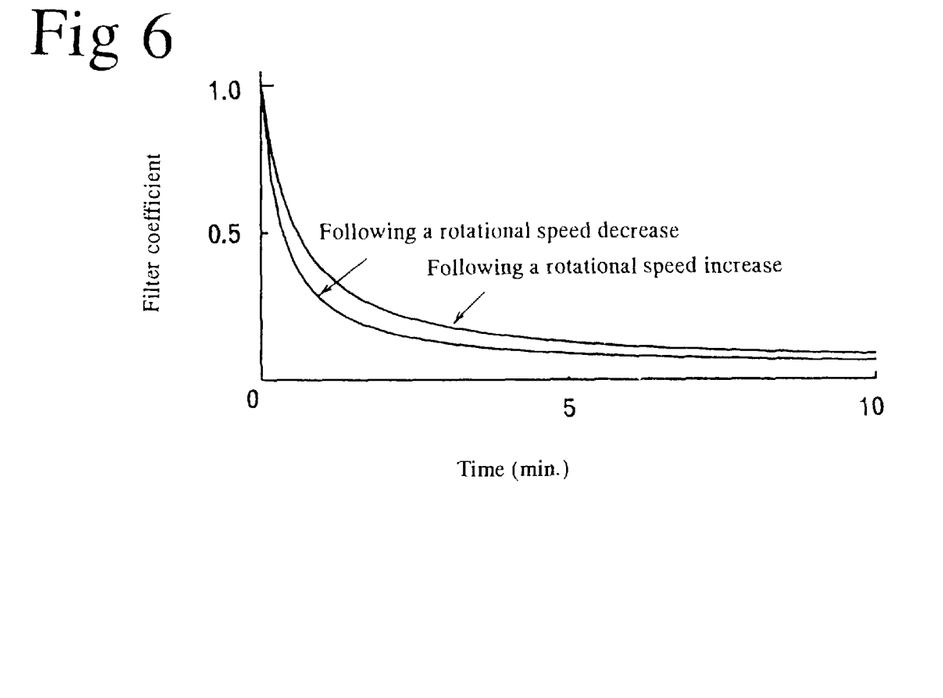
FIG. 6 is a graph showing how the filter coefficient is changed with time upon increase and decrease in the rotational speed of the main shaft of a machine tool.

The function f(n) is subject to change depending on the time constant of the temperature, Ttmp, and the time constant of the thermal displacement, T δ. Furthermore, these time constants are subject to significant change due to many factors. One such factor is that the mechanism for heat generation and heat transfer for a decelerating main shaft differs from that of an accelerating main shaft. Another factor is that heat radiation changes as the rotational speed of the main shaft decreases. FIG. 6 shows the changes with time in the filter coefficient for an increase and decrease in the rotational speed.

Figure 7:
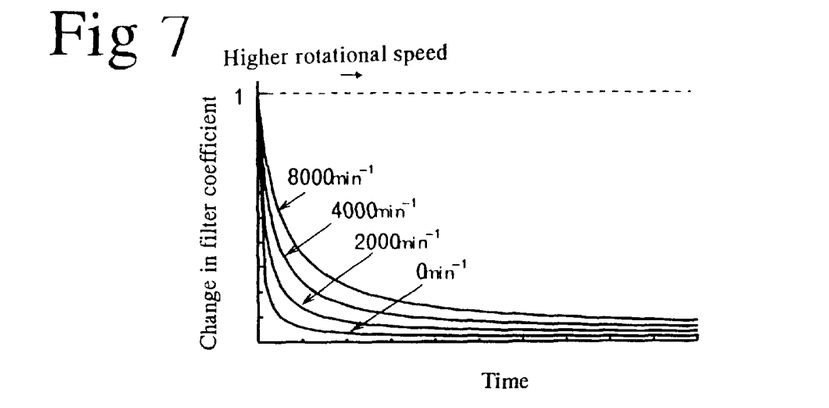
FIG. 7 is a graph showing a change in a filter coefficient with time when the rotational speed of a main shaft decreases.

In view of the foregoing description, in another embodiment, the filter coefficient starts to change when a change occurs in the rotational speed of the main shaft or when a command to change the rotational speed is issued by a control device. To further enhance the accuracy of estimation, the method disclosed in the Japanese Patent Application monitors the temperature change of the main shaft whenever the rotational speed changes. The method then determines the change in the filter coefficient depending on whether the temperature has risen or fallen. For the purpose of reference, FIG. 7 shows changes with time in the filter coefficient corresponding to decreases in the rotational speed to different lower speeds. According to the last two embodiments, since time constants that change with the rotational speed of the main shaft are reflected in the selection of the filter coefficient, the heat displacement of the main shaft can be more accurately estimated.

If the main shaft is rotated by a built-in motor, heat generated by the motor also affects the thermal displacement significantly. Accordingly, in another embodiment, this method monitors the output of a motor by using a numerical control unit and starts to change the filter coefficient when the output of the motor exceeds a threshold value, thus accurately estimating the thermal displacement of the main shaft caused by heat generated by the built-in motor.

Figure 8:
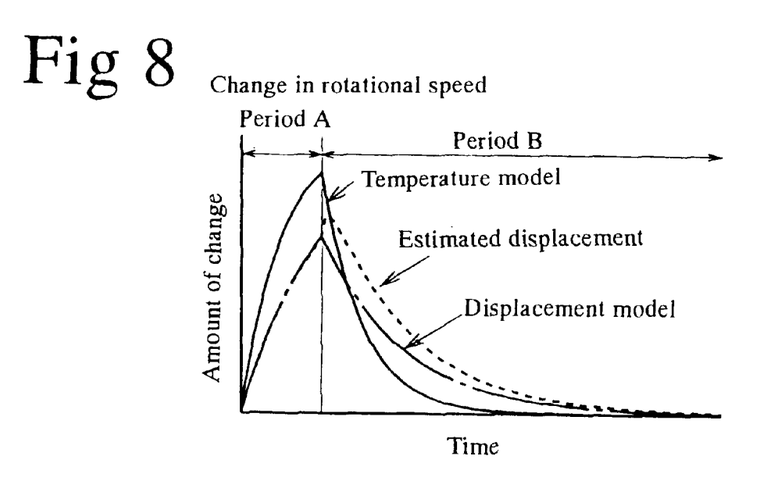
FIG. 8 is a graph showing an estimation error that occurs when the rotational speed of a main shaft changes while the thermal displacement is in a transient state.

The rotational speed of a machine tool component, such as the main shaft, may change when the thermal displacement is already in a transient state. Both the temperature and the thermal displacement of the component exhibit a first-order lag response to the rotational speed of the component. Therefore as shown in the model of FIG. 8, the thermal displacement can be accurately estimated by expression (3) in a period A in which the displacement is not in a steady state but in a transient state due to a change in the rotational speed. In a period B, following another change in rotational speed, the displacement is in a transient state and the temperature and the thermal displacement decrease. Since in period A the temperature data is higher than the above-described tentative value for estimation in period A, the tentative value in period B is pulled up by the higher temperature and remains higher than the displacement model in period B, thereby causing an estimation error.

In still another embodiment, to eliminate such an estimation error, the estimation method disclosed in the Japanese Patent Application determines whether there is a change in rotational speed while the thermal displacement is in a transient state; determines the gap between the tentative value given by expression (3) and the temperature data preceding the change; and, after the change in rotational speed, estimates the thermal displacement by substituting the most recently sampled temperature data with a gap absorption value added thereto into expression (3). Preferably, the gap absorption value is calculated by including in the calculation a temperature time constant Ttmp and the time "t" elapsed since the change in the rotational speed. The following expressions account for the above processing:

Gap=temperature data preceding rotational speed change−tentative value for displacement estimation (4)

Temperature data for substitution=current temperature data− gap·exp(−t/Ttmp) (5)

where "temperature data for substitution" corresponds to $X_n$ in the expression (3), "t" is the elapsed time from a change in the rotational speed, and "Ttmp" is a temperature time constant.

Figure 9:
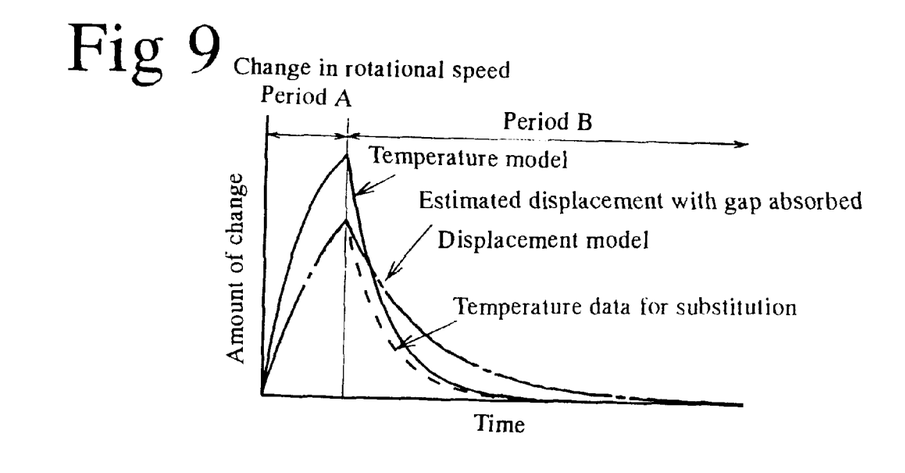
FIG. 9 is a graph showing the result of a method according to the invention for estimating thermal displacement following a change in the rotational speed of a main shaft while the thermal displacement is in a transient state.

FIG. 9 shows an estimation model to which this gap absorption processing is applied. This estimation model indicates that accurate estimation is performed.

Preferably, optimum filter coefficients may be experimentally obtained for each elapsed time, number of estimation operations, change in rotational speed, and/or command to change the rotational speed of a specific machine tool. In addition, such optimum filter coefficients may be stored in matrix tables in a storage of the numerical control device so that a suitable coefficient is retrievable for a specific machining operation. Alternatively, it will suffice to estimate the thermal displacement of the main shaft of a machine tool by expression (1) using the instantaneous temperature value and applying expressions (3)–(5) to estimation given by expression (1).

However, the above-described methods have certain drawbacks. First, an appropriate coefficient f(n) of the operational expression is difficult to determine because the mechanism for heat generation and heat transfer for a decelerating main shaft differs from that of an accelerating main shaft. Another reason for the difficulty is that the heat radiation differs significantly depending on how much the rotational speed has been decreased.

Secondly, to enhance the accuracy of estimation, a large number of matrix tables of optimum coefficients for the filter corresponding to all conceivable operating conditions of the machine tool are required. This means that a large number of experimental measurements must be performed and that the capacity of the storage device must be increased accordingly. In addition, a great deal of time is required to retrieve an optimum coefficient, which affects the response of the entire system.

SUMMARY OF THE INVENTION

In view of the above-identified problems, an object of the present invention is to provide a method for accurately and quickly estimating thermal displacement of a machine tool component under all operating conditions of the machine tool, whether the thermal displacement is in a transient state or in a steady state.

Another object of the present invention is to provide a method for accurately and quickly estimating thermal displacement of a machine tool component under all operating conditions of the machine tool without requiring a large capacity of a storage device for storing a large number of optimum filter coefficients.

The inventor of the present invention addresses the facts that: (1) the main shaft of each machine tool has a specific mode of cooling and heat generation (the time constants of thermal displacement and of temperature) when the rotational speed of the shaft has changed; and (2) that if the thermal displacement of the main shaft following a change in the rotational speed is analyzed and understood, the thermal displacement in a transient state can be estimated accurately. More particularly, the inventor realized how the thermal displacement of the main shaft changes with the change in speed of the main shaft. Additionally, the invention employs an expression that represents the relationship between the rotational speed of the main shaft and the time constants of thermal displacement and of temperature, rather than relying on matrices of previously obtained rotational speeds and corresponding time constants of thermal displacement and temperature.

The above and other related objects are realized by providing a method for accurately estimating thermal displacement of a component of a machine tool. This method comprises the steps of: (A) generating a signal representative of the temperature of at least one rotatable component of a machine tool, the at least one rotatable component having a variable rotational speed and a variable temperature; (B) converting the signal representative of the temperature into a numerical value; and (C) estimating the thermal displacement of the at least one rotatable component based on the numerical value using an operational expression. This operational expression includes a coefficient which is a function (f(n)) that changes with time or the number (n) of compensation operations performed. The function (f(n)) is determined by a relational expression (T(N)) relating the time constant (T δ) of the thermal displacement of the rotatable component and the rotational speed (N) of the rotatable component while the relational expression (T(N)) is obtained by experiment and stored in a storage device prior to implementation of the process of estimation. This expression can be used to calculate the time constants of the thermal displacement (T δ) even from rotational speeds that are not covered by the experiment. Accordingly, it is not necessary to determine by interpolation the time constants of the thermal displacement (T δ) and the rotational speeds (N). Moreover, since only the relational expression, rather than a large data volume in matrices, has to be stored in order to obtain time constants of thermal displacement (T δ) from rotational speeds (N), the method of this embodiment is advantageous in that it reduces both time required for calculations and the required size of the storage device.

In one aspect of the present invention, the function (f(n)) is determined by a relational expression (R(N)) relating the rotational speed (N) of the rotatable component and a time constant ratio (R) which is given by dividing the time constant (N) of the thermal displacement of the rotatable component by the time constant (Ttmp) of the temperature of the rotatable component The relational expression (R(N)) is experimentally obtained and stored in a storage device as in the case of the relational expression (T(N)). By using the time constant ratio R, it is possible to more accurately estimate the thermal displacement of a machine tool component whose temperature and thermal displacement time constants are subject to change due to various operating conditions such as the performance of the tool's cooling system.

In another aspect of the present invention, two functions (f(n)) are separately established, one for an increase in the rotational speed of the at least one rotatable component and the other for a decrease in the rotational speed of the at least one rotatable component. Following a change in the rotational speed, one of the two functions is selected based on the direction of the change (either an increase or decrease) in temperature data for substitution which incorporates a gap between a tentative value for estimation of the thermal displacement and measured temperature. This enables accurate estimation of the thermal displacement of the rotatable component when the direction of the change in a measured temperature does not coincide with the direction (either an increase or decrease) of the thermal displacement.

In still another aspect of the present invention, the at least one rotatable component is a main shaft.

The invention is also directed to a method for estimating the thermal displacement of a rotatable component of a machine tool, comprising the steps of: (A) generating a signal representative of the temperature of at least one rotatable component of a machine tool and a signal representative of a reference temperature, the at least one rotatable component having a variable rotational speed and a variable temperature; (B) converting the two signals representative of the two temperatures into numerical values; (C) calculating the difference between the two numerical values; and (D) estimating the thermal displacement of the at least one rotatable component based on the difference between the numerical values using an operational expression. According to this method, the operational expression includes a coefficient which is a function (f(n)) that changes with time or the number (n) of compensation operations performed. The function (f(n)) is determined by a relational expression (T(N)) relating the time constant (T δ) of the thermal displacement of the rotatable component and the rotational speed (N) of the rotatable component whereas the relational expression (T(N)) is previously obtained by experiment and stored in a storage device.

In another aspect, the reference temperature is the temperature of a component of the machine tool which is substantially unaffected by any change in the rotational speed of the at least one rotatable component.

In one embodiment, the at least one rotatable component is a main shaft.

BRIEF DESCRIPTION OF THE DRAWINGS

For a fuller understanding of the nature and objects of the present invention, reference should be made to the following detailed description and the accompanying drawings, in which:

FIGS. 2A and 2B are graphs analyzing the experiment of FIGS. 1A–1C. FIG. 2A shows the measured temperature difference divided by the amount of change for each decrease in the rotational speed (e.g., from 20,000 $\text{min}^{-1}$ to 6,000 $\text{min}^{-1}$, from 20,000 $\text{min}^{-1}$ to 2,000 $\text{min}^{-1}$). FIG. 2B shows the measured thermal displacement, respectively, divided by the amount of change for each decrease in the rotational speed;

DETAILED DESCRIPTION OF THE PREFERRED EMBODIMENTS

A machining center embodying the present invention will be explained hereinafter with reference to the attached drawings.

Figure 10:
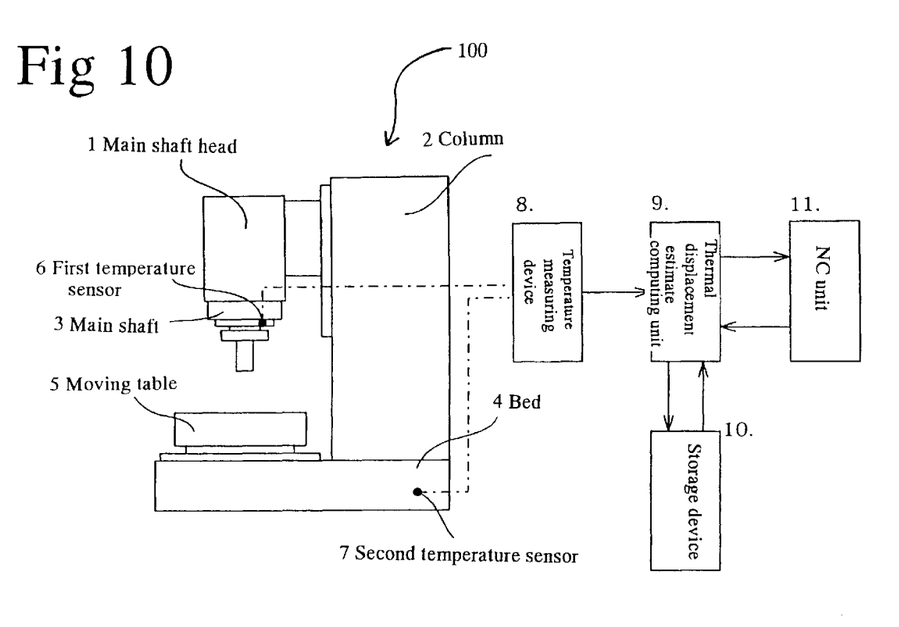
FIG. 10 is a schematic representation of a vertical machining center connected to a thermal displacement compensation system for carrying out a method of en embodiment in accordance with the present invention.

FIG. 10 shows a vertical machining center 100 which incorporates a thermal displacement compensation system including a first temperature sensor 6, a second temperature sensor 7, a temperature measuring device 8, a thermal displacement estimate computing unit 9, a storage device 10, and a numerical control unit (or NC unit) 11. It should be noted that the same system is also applicable to a horizontal machining center. The vertical machining center 100 also includes a main shaft head 1, a column 2, a main shaft 3, a bed 4, and a moving table 5. The first temperature sensor 6 is attached to the main shaft 3 and measures the temperature of the main shaft 3. Similarly, the second temperature sensor 7 is attached to the bed 4 for measuring a reference temperature. The temperature measuring device 8 is coupled to the two temperature sensors 6 and 7 so as to receive analog signals representative of the measured temperatures of the main shaft 3 and of the bed 4 as measured by the sensors 6 and 7. The temperature measuring device 8 also converts the analog signals into numerically expressed digital signals representing the temperatures of the main shaft 3 and of the bed 4. The thermal displacement estimate computing unit 9 is coupled to the temperature measuring device 8 and calculates the temperature data representing the difference between the numerically expressed temperatures of the main shaft 3 and the bed 4. Then, the thermal displacement estimate computing unit 9 estimates the correction value for the thermal displacement of the main shaft based on this temperature data using an operational expression stored in the storage device 10. The numerical control unit 11, which is coupled to the computing unit 9, then compensates for the thermal displacement of the main shaft 3 based on the correction value in a manner known in the art.

Figure 11A:
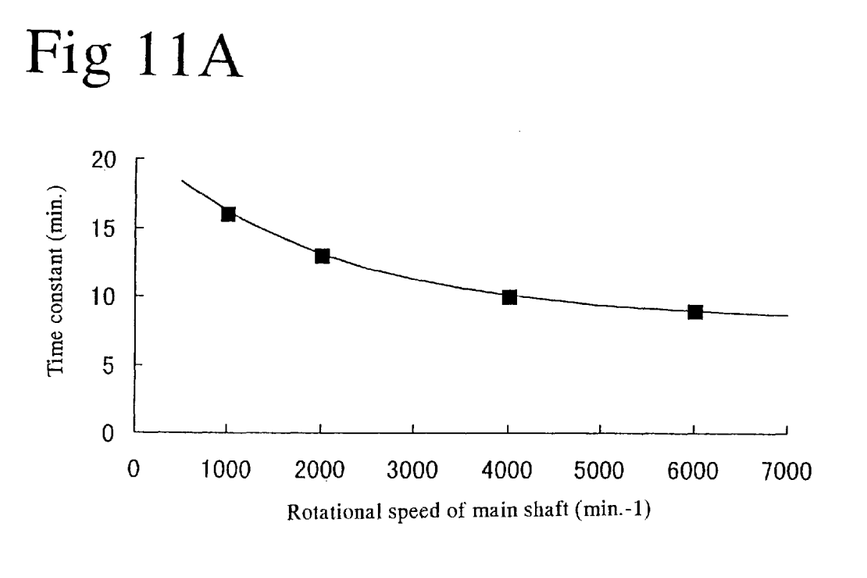
FIG. 11A is a graph showing the relationship between the rotational speed and the time constant of the thermal displacement shown in FIG. 5.

Prior to implementation, experiments are conducted on the machine tool the displacement of which is to be compensated for by the method of this embodiment in order to determine the relationship between the time constant T δ of the thermal displacement and the rotational speed N of the main shaft. The results of the experiments (matrices) are temporarily stored in a memory device. The next step is to determine a function f(n,T(N)) that includes as a parameter the expression T(N) representing the relationship between the heat displacement time constant T δ and the rotational speed N of the main shaft. FIG. 11A is a graph showing the relationship between the rotational speed and the time constant of the thermal displacement shown in FIG. 5. Based on this graph, relational expression T(N) is established as follows:

$$\text{Thermal displacement } T(N)=13 \cdot e^{-N/2000}+8.3 \quad (6)$$

The above expression (6) is established based on the experimentally obtained time constants of the thermal displacement T δ and rotational speeds N. It should be noted that this expression can be used to calculate time constants of the thermal displacement T δ even from rotational speeds that are not covered by the experiment. Accordingly, it is not necessary to determine by interpolation time constants of the thermal displacement T δ and rotational speeds N. Moreover, since only the relational expression, rather than a large data volume in matrices, has to be stored in order to obtain time constants of thermal displacement T δ from rotational speeds N, the method of this embodiment is advantageous in that it reduces both time required for calculations and the required size of the storage device.

Figure 11B:
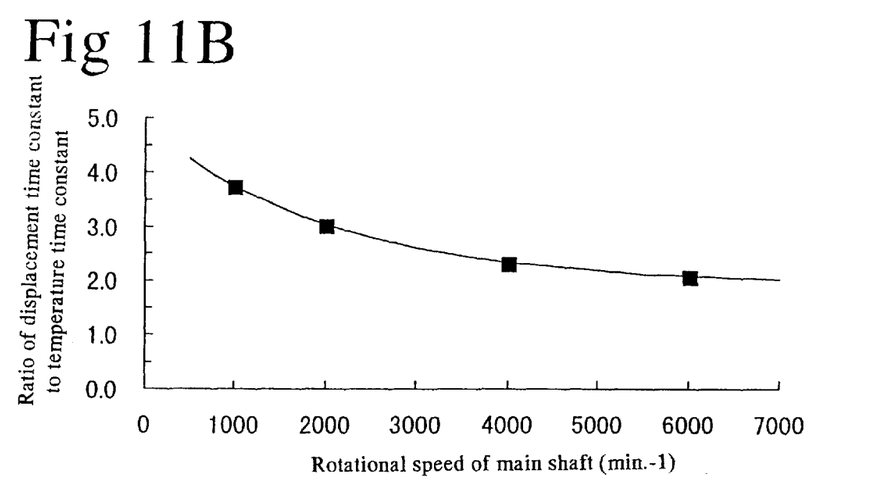
FIG. 11B is a graph showing the relationship between the rotational speed of the main shaft and the time constant ratio R of the thermal displacement time constant to the temperature time constant of the main shaft.

In addition to the relational expression T(N), a time constant ratio R is also calculated by dividing the time constant of the thermal displacement T δ by the time constant of temperature change. FIG. 11B is a graph showing the relationship between the rotational speed and the time constant ratio R. Based on this graph, function R(N) for the time constant ratio is established as follows:

$$\text{Time constant ratio } R(N)=2.95 \cdot e^{-N/2000}+1.95 \quad (7)$$

This function is advantageously applicable to the process of compensation for the thermal displacement of a machine tool component whose temperature time constant is subject to change due to various conditions, such as the performance of the tool's cooling system.

Although FIGS. 1A–C show cases in which the temperature of the main shaft drops following a decrease in the rotational speed, the temperature may rise following an increase in the rotational speed. Since the direction of the change in measured temperature (i.e., an increase or decrease in measured temperature) does not necessarily coincide with the direction of the change in thermal displacement, separate functions for time constants for increase and decrease in the rotational speed based on experimental results must be established in order to perform estimation accurately. Thus, the direction of change (an increase or decrease) in the temperature data for substitution is detected so as to determine whether the function for increase or decrease in the rotational speed is to be used. For example, if the temperature data for substitution is rising, the time constant function for increase in the rotational speed is used to estimate the thermal displacement of the main shaft.

Figure 12:
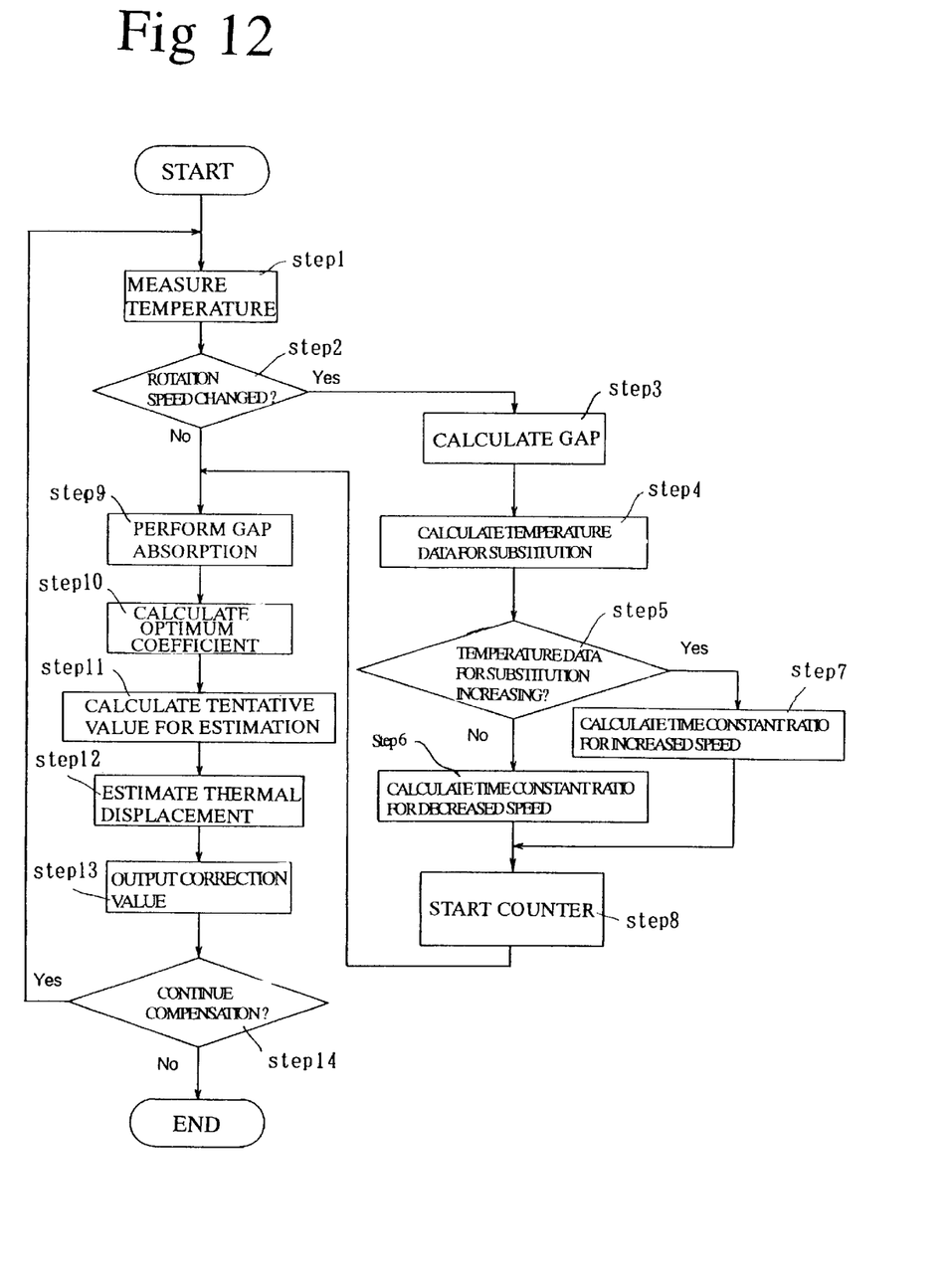
FIG. 12 is a flowchart representing a method of the embodiment for estimating the thermal displacement of a main shaft.

FIG. 12 is a flowchart representing a method embodying the present invention for estimating the thermal displacement of a main shaft. If the rotational speed of the main shaft 3 changes (Step 2) while thermal displacement compensation (which includes Step 1 of measuring the temperatures of the main shaft 3 and the bed 4) is carried out, the gap between the temperature data representing the difference between the temperatures of the bed and the main shaft, and the tentative value for estimation of the heat-displacement is given by expression (4) (Step 3). The temperature data for substitution $X_n$ is determined by expression (5) based on this gap, the time "n" elapsed since the change in the rotational speed, and the temperature time constant Ttmp (Step 4). As mentioned above (see expression (5)), the temperature data for substitution has a gap absorption value added thereto. When the gap becomes insignificant enough not to affect the calculation of the tentative value for estimation $Y_n$, this gap absorption processing may be omitted. At Step 5, the direction of change in the temperature data for substitution $X_n$ is detected in order to determine whether the time constant ratio function for an increased or decreased rotational speed is to be used. Depending on the result of this determination, an optimum time constant ratio for either an increase (Step 7) or decrease (Step 6) in the rotational speed is calculated. Even when the measured temperature is decreasing, the thermal displacement may be increasing due to the difference between the time constants of the thermal displacement and of the temperature. Accordingly, if the temperature data for substitution is determined to be increasing, the time constant ratio function for increase in the rotational speed is selected regardless of the direction of the change in the measured temperature. The process progresses to Step 8, at which point the counter starts measuring the elapsed time or the number of compensation operations. At Step 9, the gap absorption is completed.

At Step 10, an optimum filter coefficient f(n,T(N)) is calculated by the predetermined operational expression based on the selected time constant ratio and the time elapsed since the change in the rotational speed or the number of compensation operations carried out since the change in the speed according to the counter. The process goes on to Step 11, at which the tentative value for estimation $Y_n$ is calculated by the following expression (8) based on optimum filter coefficient f(n,T)) and the temperature data for substitution $X_n$.

$$Y_n=Y_{n-1}+(X_n-Y_{n-1})\cdot f(n,T(N)) \quad (8)$$

At Step 12, the thermal displacement is estimated by substituting the tentative value for estimation for the temperature in the expression (1). The correction value corresponding to this estimate of the thermal displacement is then output to the numerical control unit 11 (Step 13), with the NC unit 11 subsequently carrying out compensation for the thermal displacement (Step 14).

Figure 13:
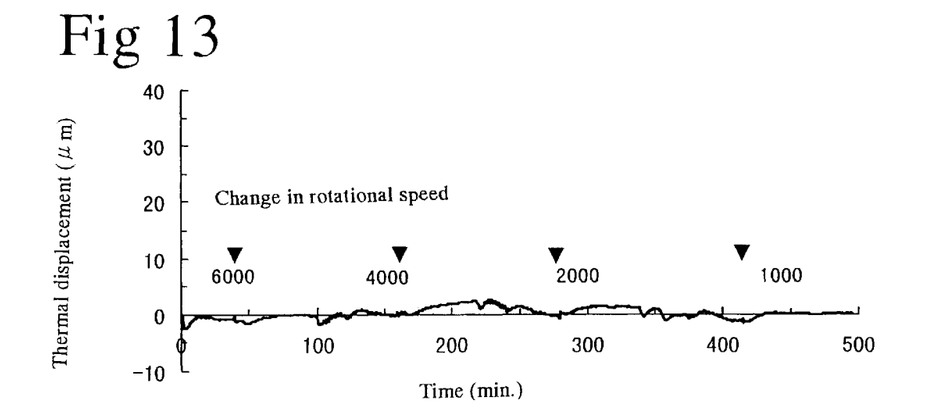
FIG. 13 is a graph showing the estimated error of the thermal displacement estimated by the method according to the present invention when compared to the actual thermal displacement.

FIG. 13 is a graph showing the estimated error of the thermal displacement estimated by the thermal displacement time constant calculated based on the function of the rotational speed according to the present invention when compared to the actual thermal displacement. When compared with the graph of FIG. 1C, it is evident that the method of the present invention can more accurately estimate the thermal displacement of the rotatable component of the machine tool regardless of the manner in which the rotational speed is changed.

As can be understood from the foregoing description, according to the present invention, the time constant of thermal displacement is calculated by the function of the rotational speed of the main shaft of a machine tool in order to accurately estimate the thermal displacement of the main shaft. Therefore, it is no longer necessary to store a large number of time constants of the thermal displacement corresponding to different rotational speeds as has been required by conventional methods. This means that time constants of the thermal displacement can be calculated from rotational speeds that are not included in an experiment. Moreover, since only the relational expression rather than a large data volume in matrices has to be stored to obtain time constants of thermal displacement from rotational speeds, the method of the invention provides the advantages that it reduces both time required for calculations and the required size of the storage device of a numerical control unit.

Furthermore, by using the time constant ratio R calculated by dividing the time constant of thermal displacement by the time constant of temperature change, more accurate compensation can be performed for the thermal displacement of a machine tool component whose temperature and thermal displacement time constants are subject to change due to various operating conditions such as the performance of the tool's cooling system.

In addition, as gap absorption is performed by considering the direction of the change in the temperature data for substitution, accurate estimation of displacement can be expected even when the direction of the change in measured temperature does not coincide with the direction of the change in thermal displacement.

As a further advantage, the thermal displacement of the main shaft can be estimated with great precision for any rotational speed as an optimum coefficient function for any specific rotational speed can be calculated according to the invention.

To calculate the tentative value for estimation of displacement, all operating conditions including transient and steady states can be covered simply by continuously changing the coefficient function, thus making it unnecessary to change the operational expression for estimation depending on the operating condition of the machine tool. In particular, if a digital filter is employed, thermal displacement can be accurately estimated even if temperature data for substitution is affected by noise.

As there may be many other modifications, alterations, and changes without departing from the scope or spirit of the essential characteristics of the present invention, it is to be understood that the above embodiment is only an illustration and not restrictive in any sense. The scope or spirit of the present invention is limited only by the terms of the appended claims.

What is claimed is:

1. A method for estimating the thermal displacement of a rotatable component of a machine tool, comprising the steps of:

(a) generating a signal representative of the temperature of at least one rotatable component of a machine tool, the at least one rotatable component having a variable rotational speed and a variable temperature;

(b) converting the signal representative of the temperature into a numerical value; and (c) estimating the thermal displacement of the at least one rotatable component based on the numerical value using an operational expression, wherein the operational expression includes a coefficient which is a function (f(n)) that changes with time or the number (n) of compensation operations performed, the function (f(n)) being determined by a relational expression (T(N)) relating the time constant (T δ) of the thermal displacement of the rotatable component and the rotational speed (N) of the rotatable component, and the relational expression (T(N)) being previously obtained by experiment and stored in a storage device.

2. A method in accordance with claim 1, wherein the function (f(n)) is determined by a relational expression (R(N)) relating the rotational speed (N) of the rotatable component and a time constant ratio (R) which is given by dividing the time constant (T) of the thermal displacement of the rotatable component by the time constant (Ttmp) of the temperature of the rotatable component, the relational expression (R(N)) being experimentally obtained and stored in a storage device.

3. A method in accordance with claim 1, wherein two functions (f(n)) are separately established, one for an increase in the rotational speed of the at least one rotatable component and the other for a decrease in the rotational speed of the at least one rotatable component, and further wherein following a change in the rotational speed, one of the two functions is selected based on the direction of the change in temperature data for substitution which incorporates a gap between a tentative value for estimation of the thermal displacement and measured temperature.

4. A method in accordance with claim 1, wherein the at least one rotatable component is a main shaft.

5. A method in accordance with claim 2, wherein two functions (f(n)) are separately established, one for an increase in the rotational speed of the at least one rotatable component and the other for a decrease in the rotational speed of the at least one rotatable component, and further wherein following a change in the rotational speed, one of the two functions is selected based on the direction of the change in temperature data for substitution which incorporates a gap between a tentative value for estimation of the thermal displacement and measured temperature.

6. A method in accordance with claim 2, wherein the at least one rotatable component is a main shaft.

7. A method for estimating the thermal displacement of a rotatable component of a machine tool, comprising the steps of:

(a) generating a signal representative of the temperature of at least one rotatable component of a machine tool and a signal representative of a reference temperature, the at least one rotatable component having a variable rotational speed and a variable temperature;

(b) converting the two signals representative of the two temperatures into numerical values;

(c) calculating the difference between the two numerical values; and (d) estimating the thermal displacement of the at least one rotatable component based on the difference between the numerical values using an operational expression, wherein the operational expression includes a coefficient which is a function (f(n)) that changes with time or the number (n) of compensation operations performed, the function (f(n)) being determined by a relational expression (T(N)) relating the time constant (T δ) of the thermal displacement of the rotatable component and the rotational speed (N) of the rotatable component, and the relational expression (T(N)) being previously obtained by experiment and stored in a storage device.

8. A method in accordance with claim 7, wherein the reference temperature is the temperature of a component of the machine tool which is substantially unaffected by any change in the rotational speed of the at least one rotatable component.

9. A method in accordance with claim 8, wherein the at least one rotatable component is a main shaft.

10. A method in accordance with claim 7, wherein the at least one rotatable component is a main shaft.

* * * * *